US007822668B1

(12) United States Patent
Benda

(10) Patent No.: US 7,822,668 B1
(45) Date of Patent: Oct. 26, 2010

(54) TOOL FOR HEDGING REAL ESTATE OWNERSHIP RISK USING FINANCIAL PORTFOLIO THEORY AND HEDONIC MODELING

(76) Inventor: Peter Benda, 11800 Shadow Run Dr., Glen Allen, VA (US) 23059-2525

( * ) Notice: Subject to any disclaimer, the term of this patent is extended or adjusted under 35 U.S.C. 154(b) by 417 days.

(21) Appl. No.: 11/589,631

(22) Filed: Oct. 30, 2006

Related U.S. Application Data

(60) Provisional application No. 60/731,829, filed on Oct. 31, 2005.

(51) Int. Cl.
*G06Q 40/00* (2006.01)
(52) U.S. Cl. .......................................... 705/36; 705/35
(58) Field of Classification Search .............. 705/35–45
See application file for complete search history.

(56) References Cited

U.S. PATENT DOCUMENTS

| 5,987,435 | A | 11/1999 | Weiss et al. | |
|---|---|---|---|---|
| 6,021,397 | A * | 2/2000 | Jones et al. | 705/36 R |
| 6,219,650 | B1 | 4/2001 | Friend et al. | |
| 6,513,020 | B1 | 1/2003 | Weiss et al. | |
| 2002/0010674 | A1 | 1/2002 | Kent | |
| 2002/0019793 | A1 | 2/2002 | Frattalone | |
| 2002/0133371 | A1 | 9/2002 | Cole | |
| 2003/0172018 | A1* | 9/2003 | Chen et al. | 705/36 |
| 2005/0015326 | A1 | 1/2005 | Terry | |
| 2005/0171883 | A1* | 8/2005 | Dundas et al. | 705/36 |

OTHER PUBLICATIONS

"Why Real Estate? An Investment Rationale for Institutional Investors: 2001 Update;" Real Estate / Porfolio Strategist; Apr. 2001; vol. 5: No. 4; Property & Portfolio Research, Inc.; Boston, Massachusetts.
Ray Torto, "Strategic Portfolio Analysis: A New Approach", Torto Wheaton Research, Jul. 1999, pp. 1-8.
Susan Hudson-Wilson and Bret R. Wilkerson, "Investment Analysis: Applying MPT to REIT Portfolios", pp. 1-10.
Barry Vinocur, "Lack of Correlation", Dow Jones Property: Property Fundamentals, Winter 2000, pp. 1-6.
D. Geltner and J. Rodriquez, Ch. 15, Real Estate Investment Trusts : Structure, Analysis, and Strategy, R. Garrigan, J. Parsons, ed., New York, McGraw-Hill, 1998, pp. 371-401.
David B. Loeper, "Asset Allocation Math, Methods and Mistakes", Wealthcare Capital Management White Paper, Jun. 2001, pp. 1-11.

(Continued)

Primary Examiner—Rajesh Khattar
(74) Attorney, Agent, or Firm—Sills, Cummis & Gross P.C.

(57) ABSTRACT

A method for optimizing risk-adjusted returns of a composite portfolio having a non-variable portion containing at least tangible residential real estate property investments and a variable portion containing other assets having a liquidity profile that is more liquid than the non-variable portion of the portfolio. The other assets in the variable portion of the portfolio are optimized in order to diversify and/or hedge risks associated with the non-variable portion of the portfolio. The optimizing is performed by calculating a mix of assets in the variable portion of the portfolio that maximizes expected returns for the composite portfolio while minimizing risks for the composite portfolio.

4 Claims, 4 Drawing Sheets

OTHER PUBLICATIONS

Petros Sivitanides, "Why Invest in Real Estate: An Asset Allocation Perspective", Real Estate Issues, vol. 22, No. 1, Apr. 1997.

Ivkorvic, Zoran, et al., "Portfolio Concentration and the Performance of Individual Investors", Nov. 2005, pp. 1-45.

Timothy W. Viezer, "Constructing real estate investment portfolios: how to use models and a few tools to build a diverse portfolio", Business Economics, 1999, pp. 1-10.

Bob Taylor, "Developing portfolio optimization models", The MathWorks News & Notes, Oct. 2006, pp. 30-32.

Michael S. Young and D. Wylie Grieg, "Drums Along the Efficient Frontier", Real Estate Review, Winter 1993, pp. 18-29.

Daniel Andersson and Peter Svanberg, "The Impact of Leveraged Real Estate on Mixed-Asset Portfolios", Master thesis, Stockholm, 2003.

Richard B. Gold, "The Use of MPT for Real Estate Portfolios in an Uncertain World", Journal of Real Estate Portfolio Management, vol. 2, No. 2, 1996, pp. 95-106.

Harry M. Markowitz, "Foundations of Portfolio Theory", Nobel Lecture, Economic Sciences, 1990, pp. 279-287.

Robert J. Shiller and Allan N. Weiss, "Home Equity Insurance", NBER Working Paper Series, Working Paper No. 4830, Aug. 1994.

William Francis Tucker, "A Real Estate Portfolio Optimizer", Johns Hopkins University Real Estate Investment Thesis, 2000-2001.

Gregory Curtis, "Modern Portfolio Theory and Quantum Mechanics", The Journal of Wealth Management, Fall 2002, pp. 1-7.

Mehndi Pirbhai, "Portfolio Optimization: The rise of Markowitz Mean-Variance models and beyond", pp. 1-10.

M. Pirbhai et al., "Portfolio Optimization", Nov. 2001.

John Alexander McNair, "Using Microsoft Excel to build Efficient Frontiers via the Mean Variance Optimization Method", Apr. 14, 2003, pp. 1-23.

"Why Real Estate? An Investment Rationale for Institutional Investors: 2001 Update", Property and Portfolio Research, Real Estate / Portfolio Strategist, vol. 5, No. 4, 2001.

Petros Sivitanides, "Property-Type Diversification in Real Estate Portfolios", J. of Real Estate Portfolio Management, vol. 2, No. 2, 1996, pp. 127-140.

Richard A. Graff and Michael S. Young, "Real Estate Return Correlations", J. of Real Estate Finance and Economics, vol. 13, 1996, pp. 121-142.

Stephen Lee, et al., "The Time Series Performance of UK Real Estate Indices", report funded by the Real Estate Research Institute, Aug. 2000.

* cited by examiner

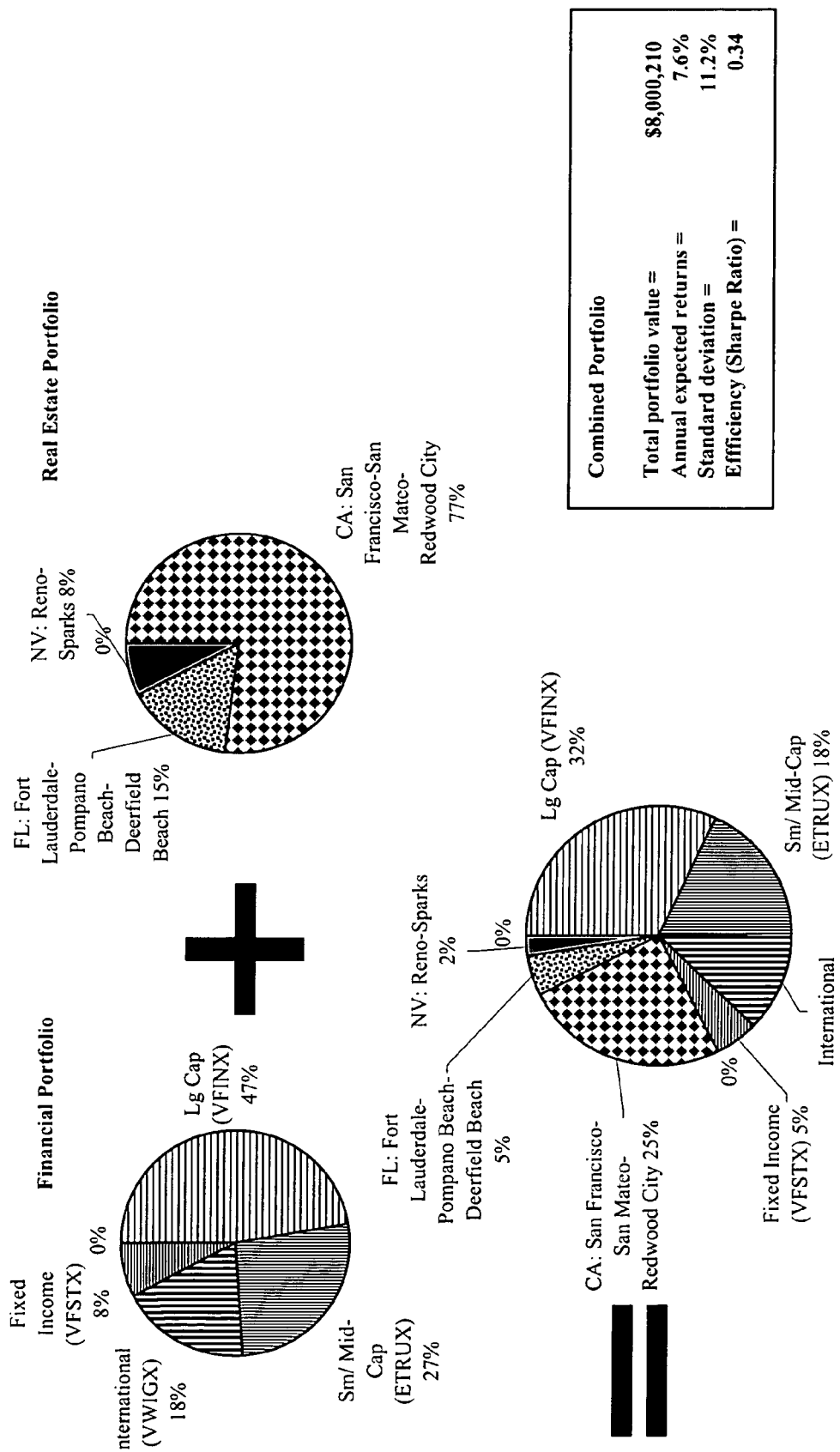
Figure 3A: Baseline Portfolio

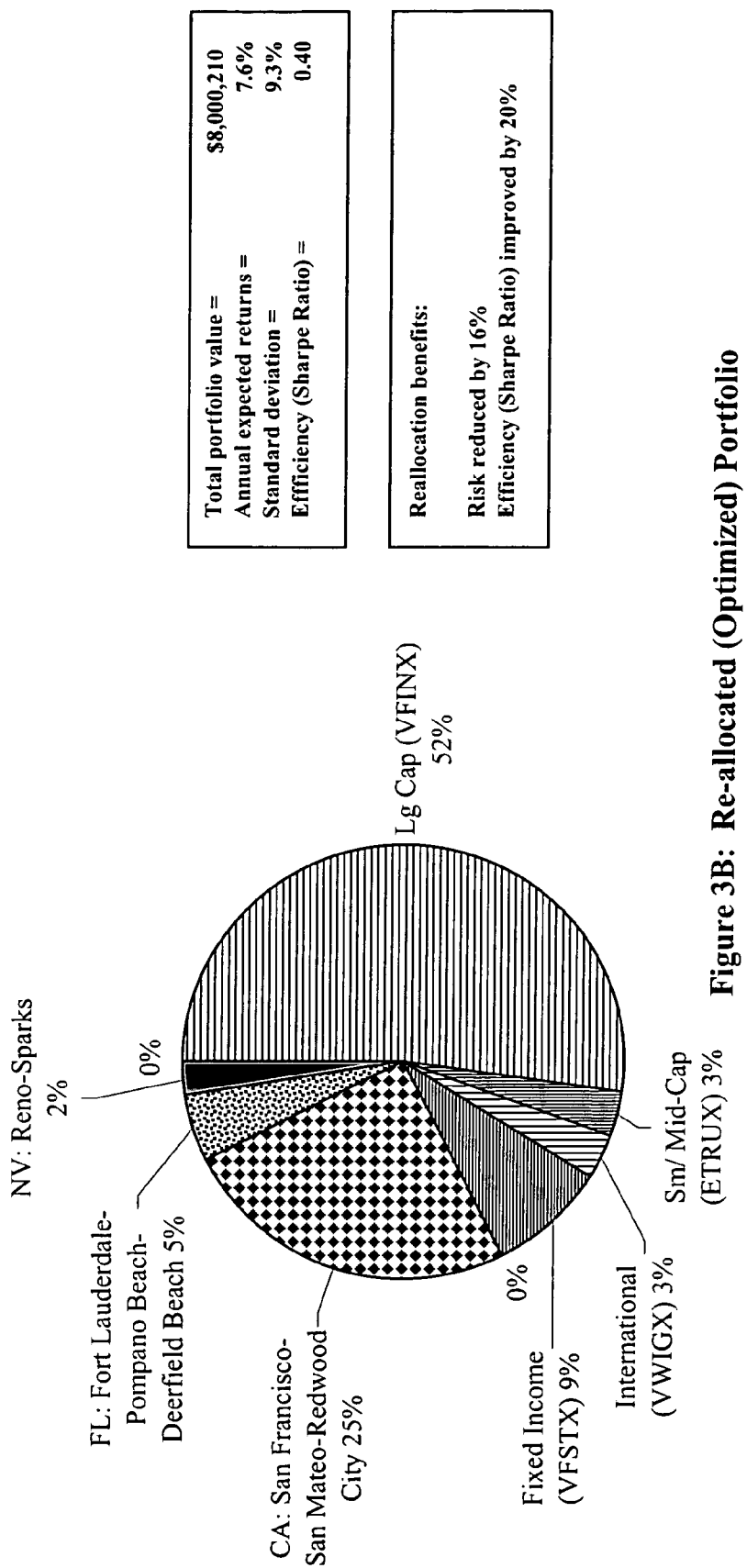
Figure 3B: Re-allocated (Optimized) Portfolio

TOOL FOR HEDGING REAL ESTATE OWNERSHIP RISK USING FINANCIAL PORTFOLIO THEORY AND HEDONIC MODELING

CROSS REFERENCE TO RELATED APPLICATIONS

This application claims priority to U.S. provisional application Ser. No. 60/731,829 filed on Oct. 31, 2005 entitled "Tool For Hedging Real Estate Ownership Risk Using Financial Portfolio Theory And Hedonic Modeling," incorporated herein by reference.

FIELD OF THE INVENTION

The present invention relates to a system and method for hedging real estate ownership risk.

BACKGROUND OF THE INVENTION

Modern Portfolio Theory (MPT), developed in the 1950s by Nobel Prize Winner Markowitz, illustrates that a portfolio of assets has different risk characteristics than the simple sum of the risks of the individual assets. Though risk can be defined in many ways, the example of MPT serves to identify a general matter of concern to investors. Under MPT, risk is defined as the standard deviation (or, alternatively the variance) on the period-to-period returns of an asset. For example, a stock with an expected return of 12% per year, and volatility expressed as a standard deviation of 15%, is expected to have returns within one standard deviation (about 68% of the time) between 12+15=27% and 12−15=−3% in any year. When numerous assets are combined in a portfolio, these standard deviations cannot simply be added up. Typically, the assets are somewhat uncorrelated, so as group, the volatilities of individual assets counteract each other, in a manner known as risk diversification. Although the long-term, average expected returns for each asset do sum up for the portfolio, the volatility of these returns will result in actual returns of some assets to increase above the expected rate, and to decrease below the expected rate for other assets, for any period of time. The combined effect is a portfolio return that has lower volatility than that of the individual returns, while the expected year-to-year return (i.e., rate of growth) remains the same.

The general principles of portfolio diversification assist in identifying a mix of assets that generate the highest expected returns at the lowest portfolio risk. Portfolio risk can be minimized by selecting assets whose volatilities are less correlated. Portfolio returns are defined by the individual expected returns of the assets. Using commercially available optimization software, one can allocate the mix of certain liquid assets (e.g., stocks, bonds, etc.) in a portfolio to achieve optimal performance, where "optimal" is typically defined as some combination of objectives for the volatility and returns of the portfolio.

Privately owned residential real estate comprises roughly $20 trillion of US wealth. By and large, this investment is not managed from a portfolio allocation standpoint, and is not accounted for in private and institutional portfolios using explicit quantitative methods of portfolio diversification. In this context, "explicit" and "quantitative" imply that asset allocations in a portfolio are based on calculations using time series histories of value and rent income data for real estate properties.

SUMMARY OF THE INVENTION

The present invention applies asset allocation to a portfolio that contains tangible real estate assets or assets whose value is derived from real estate. The invention solves several classes of problems not currently addressed in the investment community: (1) Explicitly including tangible residential real estate into the asset allocation analysis for private wealth portfolios. Today, if tangible real estate holdings are modeled at all, they are modeled with proxies such as REIT indexes or the CPI index. (2) Using other, more liquid assets in the portfolio, such as financial assets, to offset risks associated with the tangible real estate assets. Transacting real estate is expensive and time-consuming, and real estate markets are not dynamic compared to financial markets. For example, financial exchanges can execute transactions in seconds, at costs of less than 1%, while real estate transaction cycles typically last weeks and sales commissions are frequently as high as 6%. Therefore, investors are less likely to reallocate their portfolios by buying and selling real estate properties. However, those investors whose portfolios contain tangible real estate can reallocate the proportions of their financial assets in such a way that the mix of financial assets better complements the real estate assets in terms of overall portfolio risk (volatility) and return. (3) Using hedonic modeling to characterize value drivers that contribute to tangible real estate values in order to assess the role of these value drivers in overall portfolio risk (volatility) and returns. One application of the invention is to help an investor to assess the contribution of a component of total property value, such as land value, to total risk (volatility) and returns of the overall investment portfolio. (4) Using these methods to evaluate risk and return of portfolios of investment assets (such as REITs, insurance liabilities, or mortgage assets held by a mortgage company) whose value is related to discrete real estate assets.

The present invention demonstrates how both economic returns from real estate value appreciation and from cash flows (such as rent) can be incorporated into a portfolio allocation model. The method also outlines a method for disaggregating the value of real estate properties into components called value drivers, which can then be treated as virtual assets due to the fact that these value drivers have unique statistical characteristics which affect overall portfolio risks and returns differently from the property as a whole, and therefore should in some cases be accounted for independently. Such analysis permits portfolio analysts to select assets that best complement certain real estate holdings, or to select real estate investments with certain value driver characteristics that best complement other assets in the portfolio. The technique can also be used to reduce risk in a composite portfolio that contains real estate along with other assets in a way to offset or hedge risk associated with the real estate holdings by changing the mix of the other investment assets. Therefore, portfolios that contain assets with restricted liquidity (such as a real estate property) can still be optimized for risk and return by reallocating the other assets in the portfolio to complement the non-liquid assets for greater diversification and/or higher returns.

In the context of this invention, "risk" and "volatility" are used interchangeably. Risk is a statistical characterization of the unpredictability of returns. It is commonly calculated using the standard deviation (or the variance) of the period-to-period returns of the value of an asset. However, other forms of statistical characterization also exist, including "downside risk" calculations. Examples cited herein will use standard deviation (or its square, the variance) because it is the most common formulation for risk. However, it will be appreciated by those skilled in the art that these other statistical formulations for risk apply to the methods described herein.

The present invention applies this method to portfolios containing assets or liabilities whose value is determined, at least partly, by discrete real estate assets or categories of assets. For example, a mortgage company's portfolio of mortgages is secured by the value of discrete properties. The risk of the portfolio, and its value, depends in part on the risk and value of the individual properties secured by the mortgages, as well as the interaction of the values of these assets from a diversification standpoint.

In one embodiment, the present invention is directed to a method for optimizing risk-adjusted returns of a composite portfolio having a non-variable portion containing at least tangible residential real estate property investments and a variable portion containing other assets having a liquidity profile that is more liquid than the non-variable portion of the portfolio. The other assets in the variable portion of the portfolio are optimized in order to diversify and/or hedge risks associated with the non-variable portion of the portfolio. The optimizing is performed by calculating a mix of assets in the variable portion of the portfolio that maximizes expected returns for the composite portfolio while minimizing risks for the composite portfolio, subject to constraints associated with investor objectives. For example, an investor may specify an investment objective as the maximization of portfolio returns while keeping portfolio risk under a specified risk threshold. The risks for the composite portfolio correspond to a variance or other statistical characterization of the returns for the composite portfolio over a plurality of discrete time periods; and the risks for the composite portfolio depend upon risks associated with individual assets in the variable and non-variable portions of the composite portfolio and a mutual correlation of the risks associated with the individual assets. The expected returns for the composite portfolio correspond to a combination of capital gains and ongoing income that each asset in the portfolio is projected to generate, expressed as an average value over a range of time periods. Optionally, the method also selects, from a plurality of possible mortgages and financing alternatives with differing interest rate and fee characteristics, a mortgage for inclusion in the composite portfolio, wherein the selected mortgage maximizes a marginal impact on risk-adjusted returns for the composite portfolio. Risk-adjusted return is a concept that refines an investment's return by measuring how much risk is involved in producing that return, which is generally expressed as a number or rating. It is a measure of how much risk a fund or portfolio takes on to earn its returns, usually expressed as a number or a rating. This is often represented by the Sharpe Ratio. The more return per unit of risk, the better.

In accordance with a further aspect, the present invention is directed to a method for optimizing risk-adjusted returns of a composite portfolio with a variable portion containing at least one tangible residential real estate property investment. The method selects, from a plurality of possible real estate properties, at least one real estate property for inclusion in the composite portfolio, wherein the at least one selected real estate property optimizes a marginal impact on risk-adjusted returns for the composite portfolio. The optimizing is performed by calculating a mix of assets in the variable portion of the portfolio that maximizes expected returns for the composite portfolio while minimizing risks for the composite portfolio; wherein the at least one real estate property is selected from a plurality of possible real estate properties when the composite optimized portfolio containing that property has greater optimality than any composite optimized portfolio containing any other property. The risks for the composite portfolio correspond to a variance or other statistical characterization of the returns for the composite portfolio over a plurality of discrete time periods; and the risks for the composite portfolio depend upon risks associated with individual assets in the variable and non-variable portions of the composite portfolio and a mutual correlation of the risks associated with the individual assets. The expected returns for the composite portfolio correspond to a combination of capital gains and ongoing income that each asset in the portfolio is projected to generate, expressed as an average value over a range of time periods. Optionally, this embodiment also selects, from a plurality of possible mortgages with differing interest rate and fee characteristics, a mortgage for inclusion in the composite portfolio, wherein the selected mortgage or financing alternative maximizes a marginal impact on risk-adjusted returns for the composite portfolio. In addition, in this embodiment, statistical analysis of time-dependent factors that influence investment risk, return, and correlation characteristics that are identified through hedonic modeling may be applied in order to assist in a selection of a real estate property investment for inclusion in the composite portfolio.

In accordance with yet a further aspect, the present invention is directed to a method for optimizing risk-adjusted returns of a composite portfolio comprising categories of tangible real estate property investments, by selecting, from a plurality of categories of real estate property investments, at least one category for inclusion in the composite portfolio. The at least one selected real estate property investment category maximizes a marginal impact on risk-adjusted returns for the composite portfolio wherein each category of real estate property investments is defined by at least one characteristic selected from the group consisting of: physical features of the real estate property investment, type of structure, types of amenities accessible but not included; structure of mortgage or ownership; location of the real estate property investment; proximity of the real estate property investment to attractions, places of work, transportation routes, or nuisances; access to schools and services associated with the real estate property investment; applicable rules, covenants, restrictions, regulations, laws and tax structure; community controls; architectural and historical controls; factors relating to cost of ownership including community dues, taxes, various utility costs or insurance costs; costs or risks associated with region-specific atmospheric, environmental, or geological phenomena; category-specific macroeconomic and economic factors such as regional unemployment, category-specific mortgage rates, and regional available housing inventory stocks; and business performance of local employers who influence local job markets. The expected returns correspond to a combination of capital gains and ongoing income that each asset in the category will generate, and the optimizing is performed by calculating a mix of categories in the portfolio that maximizes expected returns for the composite portfolio while minimizing risks for the composite portfolio. The risks for the composite portfolio correspond to a variance or other statistical characterization of the returns for the composite portfolio over a plurality of discrete time periods; and the risks for the composite portfolio depend upon risks associated with individual categories in the composite portfolio and a mutual correlation of the risks associated with the individual categories. The expected returns for the composite portfolio correspond to a combination of capital gains and ongoing income that each asset in the portfolio is projected to generate, expressed as an average value per period. This embodiment may optionally be applied to a portfolio comprising financial assets, mortgages, or insurance claims liabilities that correspond to discrete real estate properties or categories of real estate property investments, wherein the portfolio composition can be mathematically represented in terms of the categories of real estate property.

In accordance with a still further aspect, the present invention is directed to a method for modeling a tangible real estate property investment, including creating time-dependent estimates of hedonic factors (such as those described above) that influence investment risk, return, and correlation characteristics of the real estate property investment and statistical representations of the hedonic factors. The statistical representations correspond to future contributions of the hedonic factors to expected investment risk, return, and correlation characteristics of the real estate property investment. The expected returns for the real estate property investment correspond to a combination of capital gains and ongoing income that the real estate property investment will generate. The risks of the real estate property investment correspond to a variance or other statistical characterization of the returns for the real estate property investment over a plurality of discrete time periods. This embodiment may optionally be applied to a portfolio comprising financial assets, mortgages, or insurance claims liabilities that correspond to discrete real estate properties, or categories of real estate property investments, wherein the portfolio composition can be mathematically represented in terms of the categories of real estate property.

BRIEF DESCRIPTION OF THE DRAWINGS

FIG. 3A is a diagram illustrating an original asset allocation of a user.

FIG. 3B is a diagram illustrating an optimized asset allocation of the user.

DETAILED DESCRIPTION OF THE INVENTION

Figure 1:
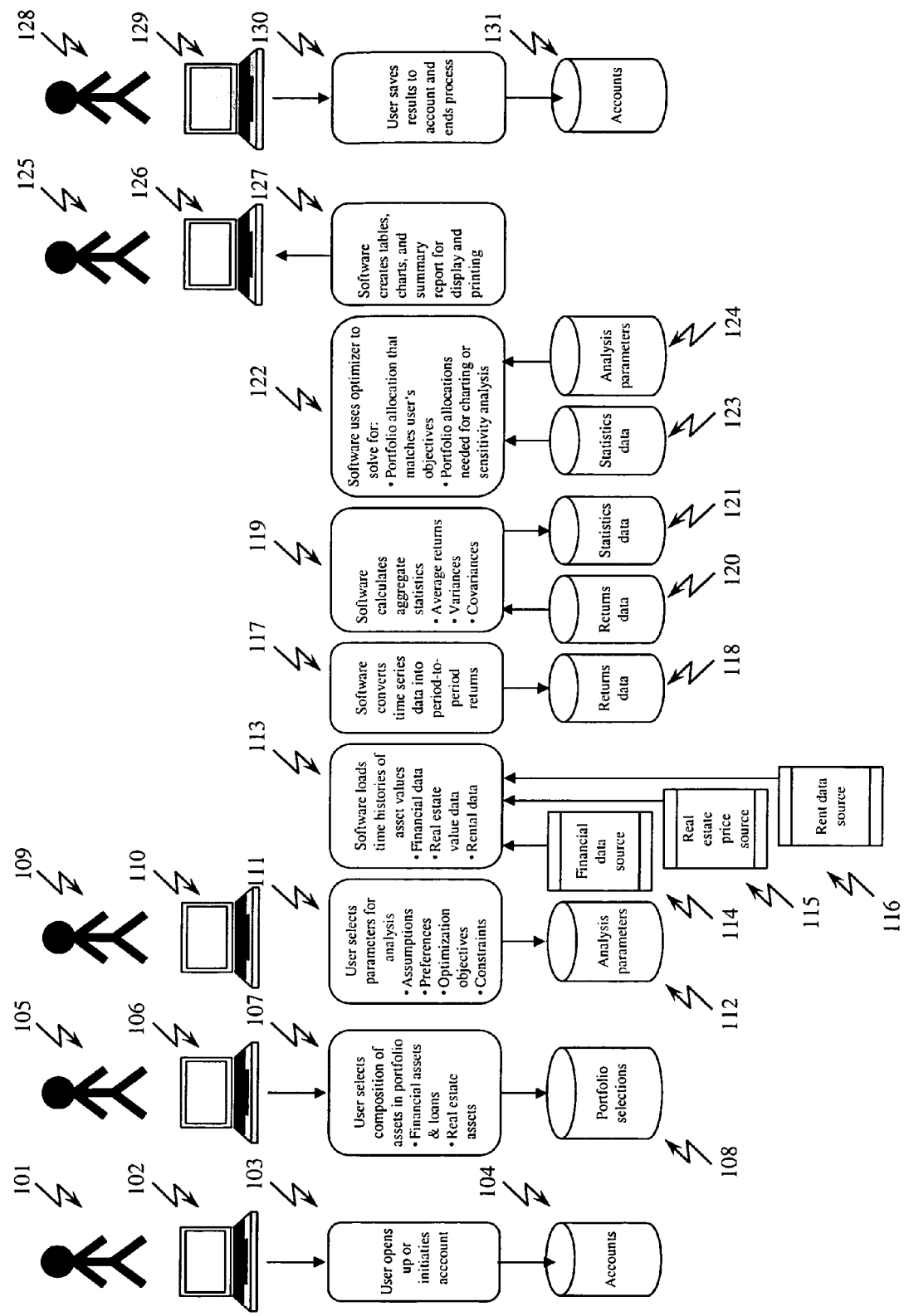
FIG. 1 is a schematic diagram illustrating a first embodiment of the invention.

The implementation of one embodiment of the invention is illustrated by the system in FIG. 1. Item 101 (also designated 105, 109, 125 and 128) represents the user, who may be a person or a computer that interacts with the system depicted in FIG. 1. This user interacts with the system through a computer interface, shown as item 102 (also designated 106, 110, 126, 129). Item 103 is a software process through which the user initiates a new account, or opens an existing account. The use of an account provides continuity for a user who may use the system repeatedly over time. Account information is stored in an account database, item 104 (also designated 131), which may also be used to save portfolio information and analytical results.

Item 107 is the process by which the user selects the assets that make up the portfolio. These asset selections may include: traditional financial investments, such as stocks and bonds; financial indices (such as an S&P500 index) as a proxy for the values of asset holdings; debt obligations such as mortgages; and tangible real estate assets (e.g., residential real estate held by the user including, for example, the user's primary residence). In one embodiment, the assets that make up the portfolio include "variable" and "non-variable" assets. For purposes of this application, "variable" assets are those assets whose allocations are varied during the optimization process (described below); and "non-variable assets" are those assets whose allocation remains fixed during the optimization process. In some embodiments, real estate assets (such as the user's primary residence and any encumbrances thereon) are treated as non-variable assets. All of the asset selections are represented by a time series of values in the form of an index. "Index", in this case, refers to stating the value of an asset, over time, in the form: "the value of $1 invested in this asset at time X(0) is worth X(n) at some period n". These selections are saved to a table or database, marked as item 108.

Item 109 is the user who interacts through interface 110 with process 111 to select parameters for the subsequent calculations. These parameters include: (1) assumptions, such as an appropriate span of time for the time series to be used in calculations; (2) preferences, largely regarding charting and form of output; (3) optimization objectives, which may take forms such as "maximize returns", or "minimize risk at risk level X"; (4) constraints, which set limits on the range of possible solutions to the optimization calculation; an example of such a constraint is: "the first asset may not comprise more than 15% of the total value of the optimized portfolio". These parameters are stored in a table or tables designated 112 (also designated 124).

Item 113 represents the process whereby the software imports, or loads, time series data corresponding to the assets selected for the portfolio in step 107. As defined above, the time series values must be in the form of an index. These time series are available from $3^{rd}$ party sources (e.g., finance.yahoo.com, Bloomberg, and Morningstar for financial assets; OFHEO for residential real estate, and HUD for rents), and may require normalization and synchronization using techniques common to a practitioner, in order to ensure consistency in subsequent calculations. For example, it might be advisable to convert all data to a monthly basis, even though some data may be available on a daily basis.

There are many methods of calculating returns, risks, and the interaction of assets in a portfolio. The simplest case, as described by Modern Portfolio Theory, is presented below to describe steps 117 through 127. This method provides a general framework from which other techniques may be derived.

Item 117 represents the process by which the index data are converted into period-to-period returns using the following equation:

$$((\text{index value at period n})/(\text{index value at period n}-1)-1) \quad (1)$$

These period-specific returns are saved to the returns data table, marked as item 118 (also designated 120).

Item 119 represents the calculation for converting returns data into statistics used in the optimization calculations. There are two calculations: "average returns" and "variances/covariances", also known as the "varcovar" matrix. For a given time period, such as Jan. 1, 1990 to Dec. 31, 2005, the average returns are the average of all returns for each period during this period. The varcovar matrix is the matrix comprising the variances and covariances of returns among all of the assets in the portfolio. Each element varcovar(i,j) of the matrix is the covariance of asset i with asset j. When i=j, the term is the variance of the asset. The process in item 119 imports values from the returns data table (item 120) and places the results of the calculations into one or more tables referred to as the statistics data table (item 121, also designated 123). As a minimum, the statistics data table should include average returns for all assets, and a varcovar matrix.

Step 122 relies on the use of an optimization algorithm, or a solver, which may be procured commercially (e.g., Solver from Frontline Systems and Matlab from Mathworks). In the context of this patent application, we use the term "solver" and "optimizer" interchangeably. Step 122 sets up an objective function, sets up constraints, and calls on the optimization algorithm to solve for an "optimal solution" within some limits of computational accuracy. Step 123 draws on the previously calculated statistics data, shown in item 123, and on the user's selected analysis parameters, selected in step 111 and shown in item 124.

Step 122 defines a variable array called W to represent the weight of each asset as a percent of the value of the total portfolio. For example, if asset 1 is an equity with a final allocated value of $150,000, and the total portfolio value is $1,000,000, then W(1)=15%. Values of W(i) will be varied by the solver until it identifies those values of W(i) that optimize the objective function. Furthermore, since the total allocation of all assets must be 100%, step 122 imposes the constraint that the sum of all W(i) must equal 100%. The investor may set other constraints, including maximum and minimum limits on the allocations of individual assets.

Step 122 also defines an array called R which comprises the average returns of each asset calculated in step 119. If the asset 1 has had an average year-to-year return of 12%, then R(1)=12%. Step 122 also defines an array V which comprises the values of the varcovar calculations performed in step 119. Step 122 also defines arrays called Wmin and Wmax, which set the constraints on the weights of each asset as a percent of total value of the portfolio. For example, for an unfinanced portfolio (no mortgages), and not allowing assets to be sold short, Wmin(i) will be no less than 0% for all assets i, and Wmax(i) will be no more than 100% for all assets i. These constraints may be modified with user input in step 111 and provided in the analysis parameters table (item 124).

Step 122 calculates the portfolio return, Rp, as the weighted average return of all assets, or the matrix multiplication of the transpose of W, and R ($Rp=W^T R$). Step 122 calculates the portfolio variance, Vp, as the matrix multiplication of the transpose of W and the matrix multiplication of V and W ($Vp=W^T VW$).

Next, step 122 defines an objective function based on the user's selection in step 111. This objective function will be expressed as some combination of risk (portfolio variance) and returns (portfolio return). A typical objective function is "maximize Rp at Vp such that sqrt(Vp)=10%", or "maximize the Sharpe Ratio=(Rp−RD)/sqrt(Vp)", where Rf is a user-defined reference rate of return.

Step 122 then calls upon the optimizer to find an allocation of asset weights W(i) within constraints Wmin(i) and Wmax(i) that achieves the objective function within acceptable limits of computational accuracy.

Finally, depending on the needs of user, the algorithm in step 122 can be iterated to calculate portfolio variances and returns over a range of values. For example, the "efficient frontier" represents maximum portfolio returns over a range of variances. Iteration over a range of values may serve different purposes, including creating a plottable data set or to generate points for a sensitivity analysis.

Steps 125-127 depict the process whereby the user interacts with the system to view results from the analysis. FIG. 3A depicts the user's original portfolio asset allocation input into the system of FIG. 1, shown as three pie charts: financial assets, real estate assets, and combined portfolio of all assets. FIG. 3B depicts the user's optimized portfolio asset allocation as calculated by the system of FIG. 1. In both diagrams, the real estate portion of the portfolio has the same allocation percentage (because this portion of the portfolio was treated as non-variable in the analysis). However, the remaining (variable) portion of the portfolio has been optimized to hedge the risks associated with the non-variable portion of the portfolio. Steps 128-130 depict the process whereby the user closes out the process, and saves results to the accounts data table 131 in step 130.

Referring again to step 107, in one embodiment the user will have the option to select from among one or several lending rates and loan types. This step may be used to input information about mortgages encumbering the user's real estate (as well as other debt) into the system. In step 107, the software applies a negative sign to loans, which converts the weight to a negative percentage. The total of the weights of all assets must remain 100%. This is the same constraint described in reference to step 122 above. For adjustable mortgages based on an index value plus a margin, step 117 must add the margin to the index imported in step 113. The approximate impact of caps and ceilings may be accounted for by adjusting the average returns, variances and covariances in step 119. For example, caps tend to reduce volatility and this can be approximated by adjusting the calculated variance for the index, either by manual corrections or a mathematical equation. To test which mortgage option (i.e., margin+index combination) creates the optimal portfolio outcome, step 122 must iterate through each of the financing options, analogous to the iteration process described below. This method can be further enhanced by setting constraints on the portfolio weight of the mortgage that let the optimizer find the optimal amount of financing.

In a further embodiment of step 107 where the user's real estate investments are treated as variable assets, the user selects all possible candidates of real estate investments, and the monetary value of the investment to be made in that asset should that be the selected asset. Step 111 is modified to allow the user to select an option that sets up step 122 in the method so that the method will optimize the portfolio with constraints set such that only one of the real estate assets can be included in the portfolio, and only then, at the monetary value assigned by the user in step 107. Step 122 must be modified to perform this optimal allocation analysis. Using integer variables in the optimization analysis is one method for accomplishing the testing and selection of the real estate investment asset in step 122. Another method uses an iterative process whereby each real estate investment asset is successively tested in the portfolio by optimizing the portfolio with that asset included. The final selection is that real estate investment that results in an optimal solution that is superior to optimal solutions corresponding to any other real estate investment.

Figure 2:
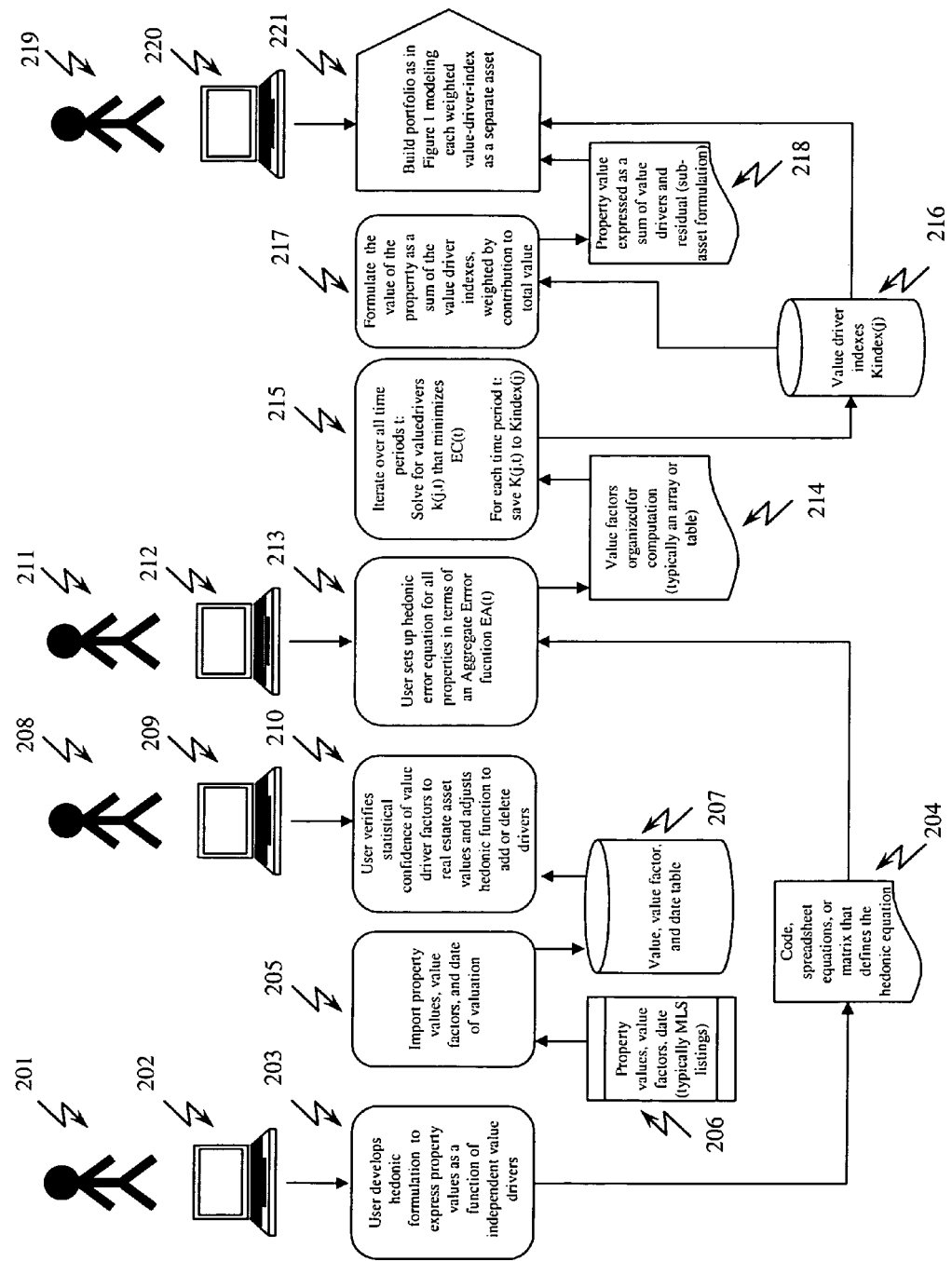
FIG. 2 is a schematic diagram illustrating a second embodiment of the invention.

In accordance with a further aspect, methods for asset allocation based on hedonic modeling are used in connection with the optimization process. The asset allocation is calculated on the basis of sub-assets whose values make up the total value of an actual asset. Each sub-asset corresponds to a value-driver of the asset. A simple, conceptual example is the valuation of a residential property based on the sum of the value of the land (the acreage of the lot) and the structure (construction cost). The land and the structure are each sub-assets, whose summed value is the value of the asset. Sub-assets do not need to correspond to discrete components of the property. For example, the value of the style of the property can be a sub-asset, and may be quantified by a binary factor such as "1" for "colonial style" and "0" for any other style. Properties with colonial style may have a sub-asset value corresponding to "style" that is substantially different for a colonial building vs. any other building. The method described below and in FIG. 2 is simplified in order to illustrate the method, but can be extended to various formulations.

For example, the mathematical formulation is linear, while the general approach can include non-linear expressions for the value drivers.

A hedonic model is a mathematical equation that estimates the value of a real estate property based on a number of factors corresponding to features of the property, and coefficients of those factors. The coefficients may be calculated by various methods. In this example, without loss of generality, we assume the use of a commercially available solver algorithm (e.g., Solver from Frontline Systems and Matlab from Mathworks). This algorithm is used to determine values for the coefficients that provide the best fit of the mathematical equation across a set of reference real estate properties. For example, one might choose to fit a hedonic model to all houses in a given neighborhood. For each house "i", at some time "t", there is an error $E(i,t)$ that corresponds to the market value of that house and the estimated (hedonic) value of the house based on the hedonic model, $Vhed(i,t)$:

$$E(i,t) = V(i,t) - Vhed(i,t) \quad (2)$$

In its simplest form, the hedonic model is a linear function comprising the sum of value drivers, $VD(i,j,t)$, where: $VD(i,j,t)$ is the value driver, or the value of the sub-asset; i designates the real estate property, j designates the sub-asset (e.g., "land value", or "construction cost"), and t designates the time at which the calculation applies. Mathematically:

$$Vhed(i,t) = \Sigma[\text{for all } j](VD(i,j,t)) \quad (3)$$

Again, in simplest form, value drivers can be expressed as the product of a value coefficient $K(j,t)$ multiplied times a value factor $F(i,j)$.

$$VD(i,j,t) = K(j,t) \times F(i,j) \quad (4)$$

In the example used above, $VD(i,l,t)$ could refer to the sub-asset "property value", and the value coefficient $K(l,t)$ would be the price per acre, and the value coefficient $\Gamma(i,1)$ would be the acreage of the lot.

The estimate error for each property is therefore:

$$E(i,t) = V(i,t) - \Sigma[\text{for all } j](K(j,t) \times F(i,j)) \quad (5)$$

The best-fit hedonic model is one which minimizes the errors $E(i,t)$ across the entire population of properties. The aggregate error across the entire set of properties, $EA(t)$, may be expressed in many ways. One simple formulation is:

$$EA(t) = \text{square root of } (\Sigma[\text{for all } i](E(i,t))) \quad (6)$$

The optimizer is used to minimize the objective function (6) within a user-specified tolerance, by solving for $K(j,t)$. The user may also apply constraints to the optimization (for example, "value per acre must be positive"). Building on the previous example, such a process might determine that housing prices in a particular neighborhood are primarily determined by two factors: land value, based on acreage at some average cost/acre, and construction cost based on house size at some average construction cost per square foot.

FIG. 2 illustrates the implementation of the algorithm described above. User 201 works through interface 202 to define the hedonic equations for real estate valuation in step 203. In the simplest form, the output of this step is a set of equations in programming code, or equations in a spreadsheet, or a table that the software in step 213 will use to identify those value factors to be used in the hedonic model. The output from step 203 is stored in some medium represented by item 204, and will subsequently be pasted into, or accessed by, the hedonic model in step 213. Examples of factors for the hedonic model include physical features of the real estate property investment, type of structure, types of amenities accessible but not included; structure of mortgage or ownership; location of the real estate property investment; proximity of the real estate property investment to attractions, places of work, transportation routes, or nuisances; access to schools and services associated with the real estate property investment; applicable rules, covenants, restrictions, regulations, laws and tax structure; community controls; architectural and historical controls; factors relating to cost of ownership including community dues, taxes, various utility costs or insurance costs; costs or risks associated with region-specific atmospheric, environmental, or geological phenomena; category-specific macroeconomic and economic factors such as regional unemployment, category-specific mortgage rates, and regional available housing inventory stocks; and business performance of local employers who influence local job markets.

Step 205 is the importation of value factors, property values, and date of the valuation, from a $3^{rd}$ party source, 206. Typically, this source will be a realty organization's Multiple Listing Services database, or county real estate records; other sources or aggregated sources may be used, For example, MLS data may be cross-referenced with geographical features to create a new set of value factors such as "distance from train station". The value factors are expressed as property-specific data in quantitative terms such as "square foot of structure", "acreage", "number of bedrooms", or other data representative of the other factors (such as those described in the preceding paragraph) that may the subject of the hedonic model. The property values will be sales price, appraised price, or some other estimate of market price for the property at some date. Step 205 may import either all value factors, or only those specified in 204 (the table or other medium that specifies the value factors). The data are organized into tables for processing by the hedonic model and stored in a table 207.

The user, 208, uses interface 209, to run statistical tests on the value factors (stored in table 207) in step 210 to establish confidence that there is a statistical relationship (such as a correlation) between the value factors and property values. Such tests can be used to eliminate or select value factors, and to redesign the hedonic formulation in step 203. For example, the user may determine that the relationship between a specific value factor and property value is non-linear, and would adjust the equations in 204 accordingly by revising step 203.

The user, 211, uses interface 212, to import or integrate the value factors 204 into the hedonic model in step 213. For example, if the hedonic model is in the form of a spreadsheet, the user copies a cell (or cells) stored in 204 and pastes it into the hedonic model spreadsheet (214) in step 213. In step 213, the equation in the copied cell is applied to all real estate properties, so the formula in the cell(s) would be pasted into an array of cells corresponding to the range of real estate properties. In other words, if there are 1000 properties, the hedonic equation developed in step 203 would be copied into 1000 cells, each cell corresponding to a property. The individual hedonic equations are in the form of equation (5) above, and the Aggregate Error function, equation (6), is either part of the software or coded in by the user. The Aggregate Error function (equation (6)) becomes the objective function for the optimizer in step 215. The output of step 213 is a table or spreadsheet, 214, which organizes hedonic equations for each property in terms of a set of hedonic factors, $K(j,t)$, which can be manipulated by the solver in step 215, and declares the Aggregate Error function $EA(t)$ as the objective function for optimization.

In step 215, the hedonic model then solves for Value Coefficients, $K(j,t)$, that minimize the Aggregate Error function (6), for a time period t. For example, the hedonic model solves for a common set of value coefficients $K(j,1990)$ that correspond to all properties for which there are market values during the year 1990. By iterating through a range of time increments, t, the solver creates a time dependent series of value coefficients, K(j,t), which are designated by the arrays Kindex(j). For example, the time-iterated hedonic model in step 215 could iterate through a range of years, 1990 through 2005, by solving for K(j,1990), then K(j,1991), and so on, through K(j,2005), in order to create time series for Kindex (1), Kindex(2), etc. A representative output would be value coefficients equivalent to: "land is valued at $x/acre in year y", or "construction cost is $x/square foot in year y", for a range of years "y". The output of the value coefficient time series data is saved into table 216.

It will be appreciated by those skilled in the art that the method above, applied to a single property, can be extended to create hedonic models for categories of similar properties.

In step 217, the software (or manual intervention from a user) converts the value of a specific property or category of properties into sub-assets, whose value is expressed by each term in the hedonic equation. Equation (4) expresses the value of each sub-asset, j, corresponding to a property or category i. As an example, the value of townhouses in some region may be expressed in terms of sub-assets such as "cost of structure related to square feet" and "location related to miles from downtown". Since the hedonic value drivers for each sub-asset will not necessarily sum up to the total value of the property, there will be a residual term, R(i,t), that accounts for other components of the value of the property. R(i,t) is calculated as:

$$R(i,t)=V(i,t)-\Sigma[\text{for all } j](K(j,t)\times F(i,j)) \quad (7)$$

This residual is mathematically equivalent to the hedonic error equation, (5).

Thus, the value of the property can be expressed as a sum of the values of sub-assets:

$$\text{Value}=\text{value of sub-asset 1}+\text{value of sub-asset 2}+\ldots+\text{residual} \quad (8)$$

Or:

$$V(i,t)=\Sigma[\text{for all } j](K(j,t)\times F(i,j))+R(i,t) \quad (9)$$

And each sub-asset is valued as:

Value of sub-asset 1 for property $i=K(1,t)\times F(i,1)$

Value of sub-asset 2 for property $i=K(2,t)\times F(i,2)$

...

Value of the residual sub-asset for property $i=R(i,t)$. (10)

This formulation for the values of the sub-assets is stored as code, spreadsheet cells, or an array in some medium, 218.

In step 221, the user, 219, uses interface 220, to launch the method described in FIG. 1, defining the investment property or category in the portfolio in terms of the sub-assets, equation (7). For example, the portfolio might contain land assets as well as residential properties. The land assets could be modeled in the portfolio allocation using a simple index for land values, but the residential properties could then be modeled as a set of sub-assets, thus the portfolio can be a blend of assets and sub-assets. In step 221, the user also must define optimization constraints for the sub-assets such that the sub-assets are constrained to sum to the total value of the property. For example, if a residential property is valued at $500,000, and the land is valued at $200,000, the structure is valued at $200,000, then the residual must be set to $100,000 in order to total $500,000. These asset values represent the distribution of actual values of assets and sub-assets within the investor's portfolio. By contrast, the indexes Kindex(j) are used to calculate the statistical expected returns and risk (volatility) of these values.

The method outlined above, and described in FIG. 2, can be extended to account for income streams (value creation) associated with rents or other cash flows. The method can also be extended to categories of investments. For example, the sub-assets "land value" and "construction costs" can be formulated for a category of properties held in a portfolio, such as "residential 2 bedroom homes on small lots". Further, this method can be extended to real-estate-derived assets or liabilities in a portfolio. For example, a portfolio of holdings by a REIT could be modeled in terms of the categories of direct investments in properties, or inventories held by the companies in which it has invested. Finally, it will be appreciated by those skilled in the art that still further changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A computer-implemented method for diversifying risks in directly owned real estate assets, the method comprising:

identifying a composite portfolio that comprises (i) at least one directly owned real estate asset and (ii) variable assets that are more liquid than the at least one directly owned real estate asset; and calculating, by a computer, an allocation of the variable assets in the composite portfolio that diversifies risks associated with the at least one directly owned real estate asset in the composite portfolio, said calculating comprising:

treating the at least one directly owned real estate asset in the composite portfolio as a non-variable asset, calculating a risk profile for the non-variable asset based on data relating to value of the directly owned real estate asset;

calculating a plurality of mixes of the variable assets that have risk profiles that complement the risk profile of the non-variable asset; and selecting, as said allocation that diversifies risks associated with the at least one directly owned real estate asset, one mix of the variable assets among said plurality that provides at least one of greater expected returns for the composite portfolio and lesser risks for the composite portfolio compared to other mixes of variable assets in said plurality, wherein the risks for the composite portfolio correspond to a statistical characterization of the returns for the composite portfolio over a plurality of discrete time periods, and wherein the risks for the composite portfolio depend upon risks associated with the variable and non-variable assets in the composite portfolio and a mutual correlation of the risks associated with the variable and non-variable assets; and wherein the expected returns for the composite portfolio correspond to a combination of capital gains and ongoing income that each asset in the composite portfolio is projected to generate, expressed as an average value over a range of time periods.

2. The method of claim 1, where calculating said allocation of the variable assets further comprises:

calculating, by a computer, additional contribution to risks and expected returns for the composite portfolio by at least one of:

physical features of the real estate property, type of structure, types of amenities accessible but not included; structure of mortgage or ownership; location of the real estate property investment; proximity of the real estate property investment to attractions, places of work, transportation routes, or nuisances; access to schools and services associated with the real estate property investment; applicable rules, covenants, restrictions, regulations, laws and tax structure; community controls; architectural and historical controls; factors relating to cost of ownership including community dues, taxes, various utility costs or insurance costs; costs or risks associated with region-specific atmospheric, environmental, or geological phenomena; category-specific macroeconomic and economic factors such as regional unemployment, category-specific mortgage rates, and regional available housing inventory stocks; and business performance of local employers who influence local job markets; and calculating said allocation of the variable assets in the composite portfolio based further on said additional contribution.

3. The method of claim 2, wherein at least one mix of variable assets comprises at least one of: financial assets and mortgages.

4. The method of claim 1, wherein at least one mix of variable assets comprises at least one of: financial assets and mortgages.

* * * * *